United States Patent [19]

Ballentine

[11] 4,259,144

[45] Mar. 31, 1981

[54] BI-DIRECTIONAL TAPE APPLICATOR HEAD AND METHOD

[75] Inventor: Robert H. Ballentine, Ridley Park, Pa.

[73] Assignee: The Boeing Company, Seattle, Wash.

[21] Appl. No.: 949,477

[22] Filed: Oct. 10, 1978

[51] Int. Cl.² .............................................. B32B 31/00
[52] U.S. Cl. ................................... 156/522; 156/523; 156/584
[58] Field of Search ............... 156/522, 523, 574, 577, 156/584, 204, 459, 468, 475, 361

[56] References Cited

U.S. PATENT DOCUMENTS

| | | | |
|---|---|---|---|
| 3,325,334 | 6/1967 | Burnet | 156/459 |
| 3,810,805 | 5/1974 | Goldsworthy | 156/361 |

*Primary Examiner*—Douglas J. Drummond
*Attorney, Agent, or Firm*—Felix J. D'Ambrosio; Edwin E. Greigg; Jack D. Puffer

[57] ABSTRACT

The invention relates to a tape applicator head for dispensing tape onto a working surface for the construction of primarily structural parts, and to a method of laying tape onto a working surface.

The tape applicator head includes a housing which is preferably displaced relative to the working surface. The housing includes a tape dispensing outlet where at least one tape dispensing structure has a tape engaging surface which imparts a tension to the tape as the tape applicator head is displaced relative to the working surface to drive the tape through the tape head. Preferably, two tape dispensing blocks are mounted to the housing at the tape dispensing outlet adjacent to each other. These blocks define spaced, symmetrically oriented surfaces which alternately engage the tape and impart the noted tension thereto as the tape applicator head is displaced in two opposing directions relative to the working surface. With this latter arrangement, the orientation of the tape applicator head is maintained unchanged. In addition, the symmetrically oriented surfaces extend outwardly from the tape dispensing outlet substantially parallel to the working surface with the minimum clearance between the working surface and the symmetrically oriented surfaces being less than the thickness of the tape, so that the tape is compressed or compacted as it is dispensed onto the working surface.

According to the method, the tape is compressed or compacted, as noted above, and folded at each end of a tape laying pass so that a continuous layup can be rapidly produced.

30 Claims, 4 Drawing Figures

BI-DIRECTIONAL TAPE APPLICATOR HEAD AND METHOD

BACKGROUND OF THE INVENTION (a) Field of the Invention

The field of the invention encompasses tape dispensing and application.

The invention was developed primarily for use in the field of composite technology. In particular, the invention is used in constructing, for example, helicopter rotor blades, rotor blade parts, and other structural and aerodynamic parts of a helicopter. The invention can also be used, however, for the construction of structural and aerodynamic parts of aircraft other than helicopters, for the construction of missiles, satellites, automobile bodies, rail cars, ships and the like.

According to composite technology, a resin pre-impregnated tape having, for example, fiberglass filaments is utilized with or without an additional resin adhesive to construct the particular part desired. The final part is built-up of a successive application of layers of the tape to, for example, a mandrel. The resulting part is light in weight and highly load redundant, so that it is more desirable than a corresponding part made from the traditional materials, such as steel, etc.

(b) Prior Art

In the early days of the development of composite technology the principal means for producing a so-called lay-up, i.e., a shaped but non-structuralized part which has been shaped using a given quantity of tape in one or more layers upon, preferably a mandrel, was by hand. Naturally the procedure was time consuming and consequently expensive.

In the helicopter art, and in particular the rotor blade art, manual procedures are still used to some degree. However, machinery has been developed for replacing to a large extent the known manual procedures. One such machine in the form of a composite tape placement head is disclosed in U.S. Pat. No. 3,775,219. Although it is not evident from the cited patent, the composite tape placement head disclosed is quite large, and consequently represents a significant capital investment. For the purpose of this invention, the portion of the placement head of the cited patent which is of primary interest is the subassembly designated by the letter T. The head T must be rotated at the end of laying each strip of tape on the work piece W. Consequently, the tape must be severed at the end of each tape laying pass. In addition, the tape is drawn from a supply spool by a drive roller, which is situated between the supply spool and a tape placement roller which engages the work piece W. The tape is not drawn by the movement of the applicator head.

OBJECTS OF THE INVENTION

It is an object of the invention to provide the state-of-the-art with a tape applicator head that is smaller in size and therefore less costly yet versatile in application.

It is another object of the invention to provide the state-of-the-art with a tape applicator head on which the man-hours per lay-up are reduced, thereby reducing operating costs.

It is another object of the invention to provide the state-of-the-art with a tape applicator head which is bi-directional, i.e., a tape applicator head which can dispense and apply tape in two opposed directions while the orientation of the head remains unchanged.

It is another object of the invention to provide the state-of-the-art with a tape applicator head in which the mechanism for dispensing the tape is simplified, relying in this regard on the movement of the tape applicator head.

It is another object of the invention to provide the state-of-the-art with a tape applicator head which not only dispenses the tape onto a working surface but compresses or compacts the tape as well during the dispensing procedure.

It is another object of the invention to advance the state-of-the-art by the method according to which the tape is compacted and then folded at each end of a tape laying pass so that a continuous lay-up can be rapidly produced.

It is a related object of the invention to provide the noted applicator head with a mechanism for advancing the tape through the applicator head and past the dispensing outlet of the applicator head.

It is another related object of the invention to provide the state-of-the-art with a tape applicator head which possesses the attributes of the tape applicator head referred to in the prior stated objects, can be utilized to practice the method of compacting and folding the tape at each end of a tape laying pass and is hand operated.

SUMMARY OF THE INVENTION

The invention exhibits at least five points of novelty. These are as follows:

1. Dispensing tape from a tape applicator head onto a working surface and compressing or compacting the tape on the working surface. A structural component having a curved surface at the dispensing outlet of the applicator head both draws the tape through the applicator head for dispensing the tape and compacts the tape on the working surface.

2. Dispensing tape from a tape applicator head in two opposing directions while maintaining the orientation of the head unchanged. Two adjacent structural components each having a curved surface at the dispensing outlet of the applicator head are utilized. Each structural component has the capability noted in point 1. In addition, because of the dual component arrangement, the tape can be folded at each end of a tape laying pass.

3. Advancing tape through the tape applicator head by a predetermined length past the tape dispensing outlet of the tape applicator head.

4. Guiding the tape backing strip from the tape using a portion of the tape applicator head housing.

5. Dispensing tape from a tape applicator head which possesses the novelty of points 1-4 and in addition can be hand held.

From a structural aspect, the invention is embodied in a preferred form as shown in the drawings and described in detail below. The preferred components of the tape applicator head include: a compact housing; a guide block; a cam roller; and two dispensing and compacting blocks. The housing defines a tape passage which passes through the housing from top to bottom. Within the housing and adjacent to the passage are mounted the guide block, the cam roller and the dispensing and compacting blocks. The cam roller is mounted adjacent to an idler roller which together straddle the tape passage. The idler roller also forms part of a guide means along with the guide block. At the bottom of the housing the tape passage terminates in a tape outlet. The two guide blocks are mounted to the housing at the tape outlet adjacent to each other. These blocks each include a curved surface which engages the tape and impart to the tape a driving tension which draws the tape through the tape passage.

In addition, the curved surfaces, in conjunction with the working surface on which the tape is applied, effect the method aspect of the invention in that they compress or compact the tape as it is dispensed onto the working surface. This is accomplished by insuring that the minimum clearance between the working surface and the curved surfaces is less than the thickness of the tape. With these two blocks the tape applicator head can dispense tape in two opposing directions while maintaining the orientation of the head unchanged, and as a result, fold the tape at each end of a tape laying pass.

The tape applicator head is compact and easily managed by one person. The tape applicator head housing is approximately ten inches from top to bottom including the dispensing and compacting blocks and approximately five inches on a side.

The bi-directional feature of the invention has reduced the man-hours in one application by a factor of ten. Threading of the head with a new tape spool, and advancing of the tape whenever severing is desired, is facilitated by the cam roller design.

Overall, the tape applicator head of the invention is economical to manufacture and maintain. It is easy to operate and produces the lay-up of a composite structure or a part thereof at less cost than has been the case heretofore.

DETAILED DESCRIPTION OF THE PREFERRED EMBODIMENTS AND METHOD

Apparatus

Figure 1:
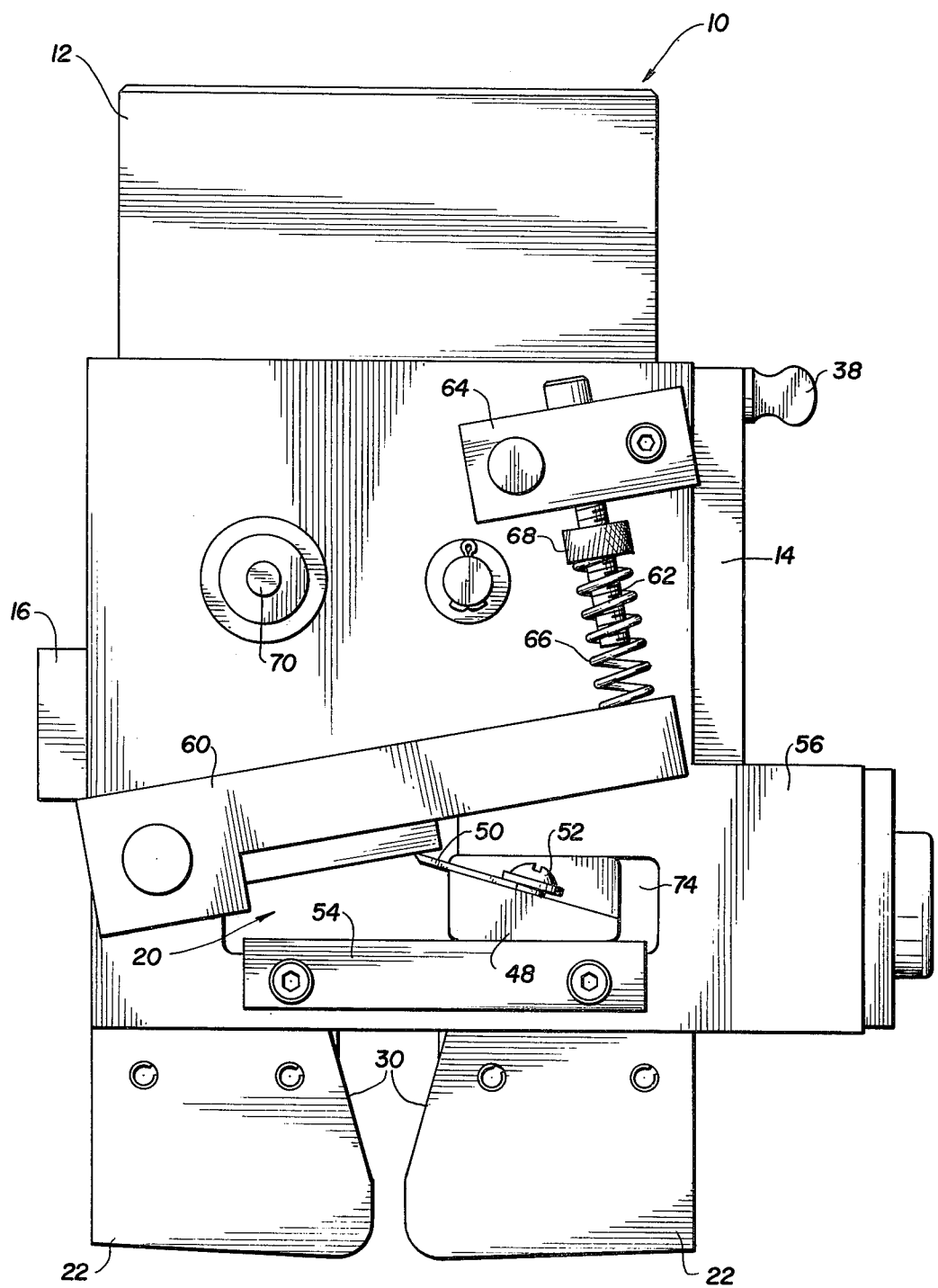
FIG. 1 is a right-side elevational view of the tape applicator head according to one preferred form of the invention.

The noted drawings illustrate a preferred form of the tape applicator head 10. The applicator head 10 includes a housing 12, guide blocks 14 and 16, a cam roller 18 (FIG. 2), tape severing mechanisms 20 and dispensing and compacting blocks 22.

According to one preferred embodiment, the housing 12 is mounted to a support structure in a manner not shown, for displacement relative to a working surface 24. The tape applicator head can have as many degrees of freedom of movement relative to the working surface 24 as desired. The manner in which this is accomplished is not part of the invention and is dictated primarily by the shape of the structure to be constructed. Preferably, the tape applicator head 10 of the invention is mounted for displacement along three coordinated axes relative to the work surface 24. In addition, the head can be rotated relative to the vertical axis z—z although the bi-directional feature of the invention eliminates the need for such rotation.

As an alternative, it is also possible to mount the applicator head 10 in a stationary manner and to move the work surface 24 relative to the head. Again, whether the applicator head 10 or the working surface 24 is moved is optional, and the structure for moving them need not be discussed in further detail since it does not form a part of the invention.

Figure 2:
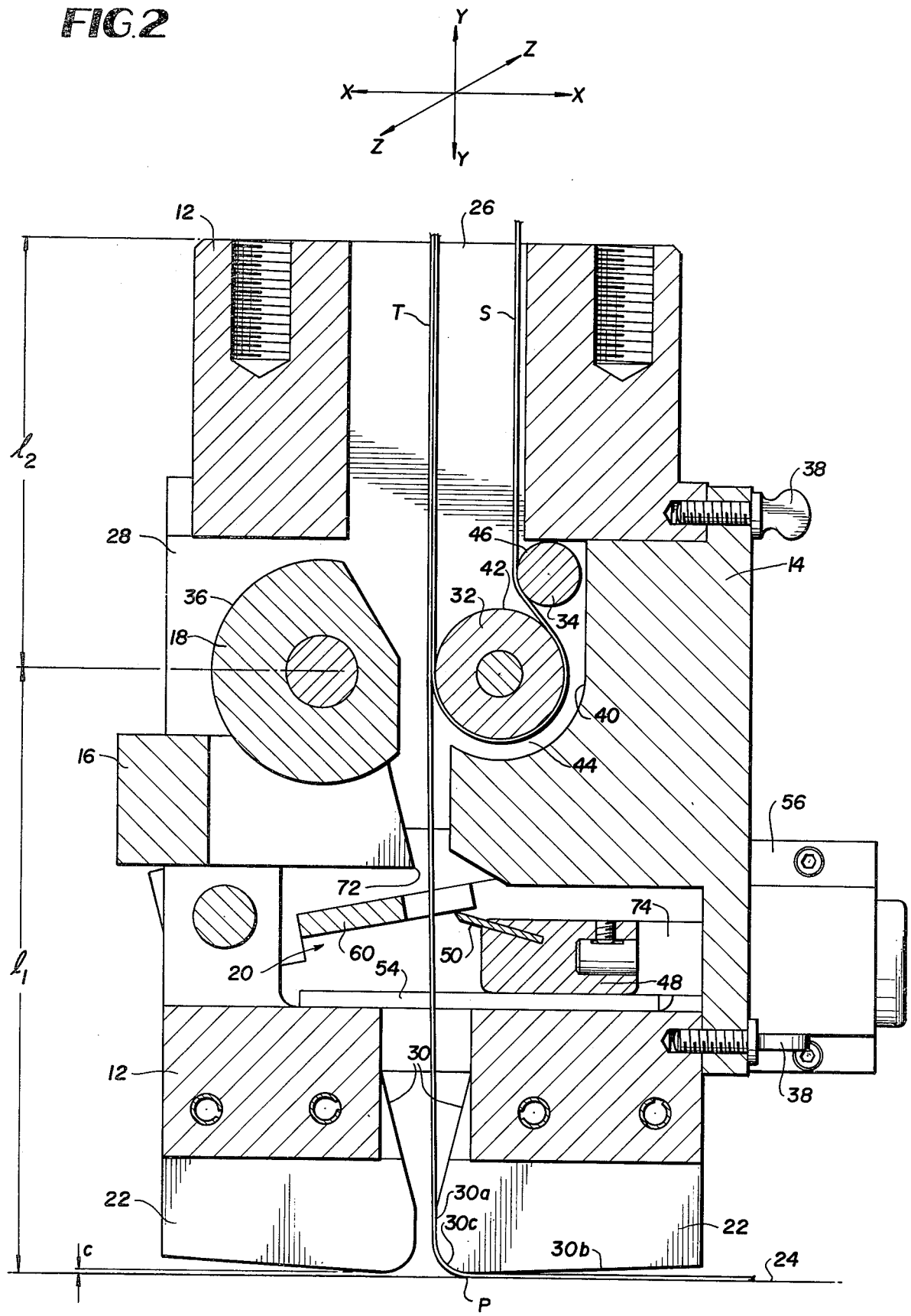
FIG. 2 is a partial longitudinal cross-sectional view of the tape applicator head of FIG. 1.

The housing 12 is constructed as a cast aluminum block through which a longitudinal passage 26 and transverse passage 28 are defined (FIG. 2). The longitudinal passage 26 serves as a tape passage for the tape T. The passage 26 terminates in a tape dispensing outlet which is defined by the surfaces 30 of the blocks 22. These surfaces are preferably formed as partly curved, symmetrically oriented continuous surfaces which laterally delimit the tape passage 26 at the dispensing outlet.

The cam roller 18 and idler rollers 32 and 34 are mounted within the housing 12, while the blocks 14 and 16 are mounted externally of the housing and extend into the housing through passage 28. The cam roller 18 and idler roller 32 are mounted adjacent to each other and cooperate in a manner described below for advancing the tape T past the blocks 22. Preferably, the cam roller 18 is constructed of aluminum; and the idler rollers 32 and 34, the guide blocks 14 and 16 and the dispensing and compacting blocks 22 are constructed of teflon. Alternatively, the blocks 22 are constructed of aluminum with a teflon coated surface 30.

The cam roller 18 has an outer surface which has a partially circular portion 36. The circumference of this circular portion is at least equal in length to the distance $l_1$ (FIG. 2), with $l_1$ being greater than $l_2$. In this way, a single rotation of the cam roller 18 advances the tape T through the distance $l_1$ and accumulates the tape backing strip S in the passage 26 above the idler roller 34.

The guide block 14 is mounted to the housing 12 by two thumb screws 38 and is therefore easily removed and mounted to the housing. The guide block 14 includes a curved guide surface 40 which is spaced from and is coextensive with a portion of the outer surface 42 of the idler roller 32, and together with the surface 42 defines a tape backing strip passage 44 which intersects the tape passage 26 downstream of the point of contact of the cam roller 18 and the idler roller 32. The passage 44 is continued by the surface 42 and the outer surface 46 of the idler roller 34, and intersects the passage 26 upstream of the point of contact of the cam roller 18 and the idler roller 32.

As an alternative, the guide block 14 can be formed as part of the housing 12. In that case, however, a removable block is nevertheless necessary for access to the tape passage 26 in the area of the cam roller 18 and idler roller 32. The removable block can be mounted to an adjacent housing wall to that shown in FIG. 2.

The guide block 16 forms part of the tape severing mechanism 20. The tape severing mechanism 20 also includes a blade mounting block 48 to which the ends of a blade 50 are secured by screws 52 (FIG. 1), a guide block 54, an actuator 56 and a return mechanism 58 (FIG. 1). The return mechanism 58 includes a pivotably mounted lever 60, a threaded shaft 62 mounted to a pivot block 64, a compression spring 66 and an adjustment screw 68 which is used to adjust the force exerted by the spring 66 against the lever 60. The return mechanism is most clearly shown in FIG. 1. Preferably, the blade mounting block 48 is constructed of aluminum, the guide block 54 of teflon, the lever 60 of steel, the pivot block 64 of aluminum and the blade 50 of steel.

Figure 3:
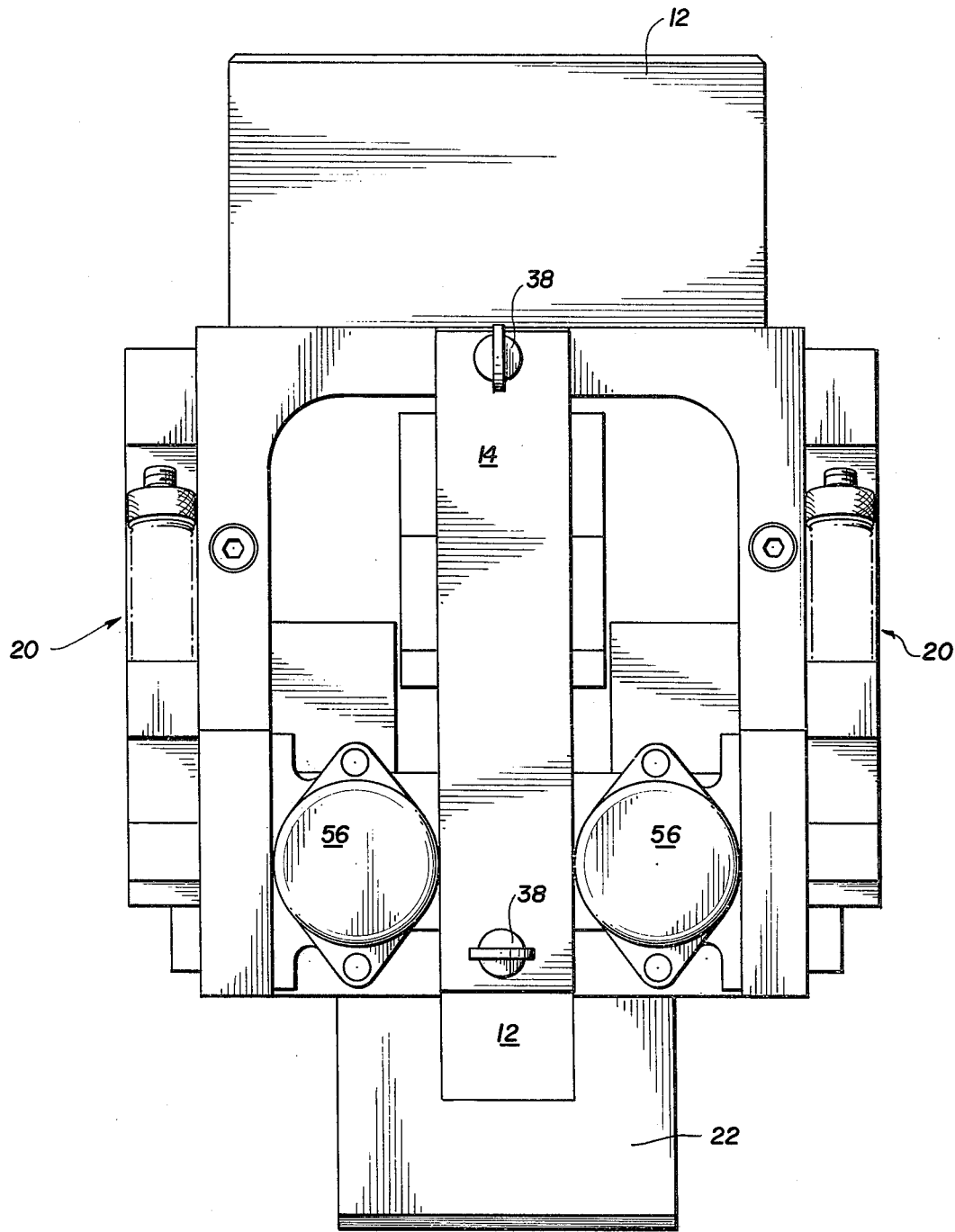
FIG. 3 is a rear-side elevational view of the tape applicator head of FIGS. 1 and 2.

There are actually two tape severing mechanisms 20 and return mechanisms 58, as can be seen in FIG. 3, which operate simultaneously.

As shown in FIGS. 2 and 3, the blocks 22 are mounted to integral extensions of the housing 12. The surfaces 30 of these blocks include a flat vertical portion 30a which is joined to a flat continuously, upwardly tapered portion 30b by a curved portion 30c. The curved portion 30c lies along a radius to both surface portions 30a and 30b.

Figure 4:
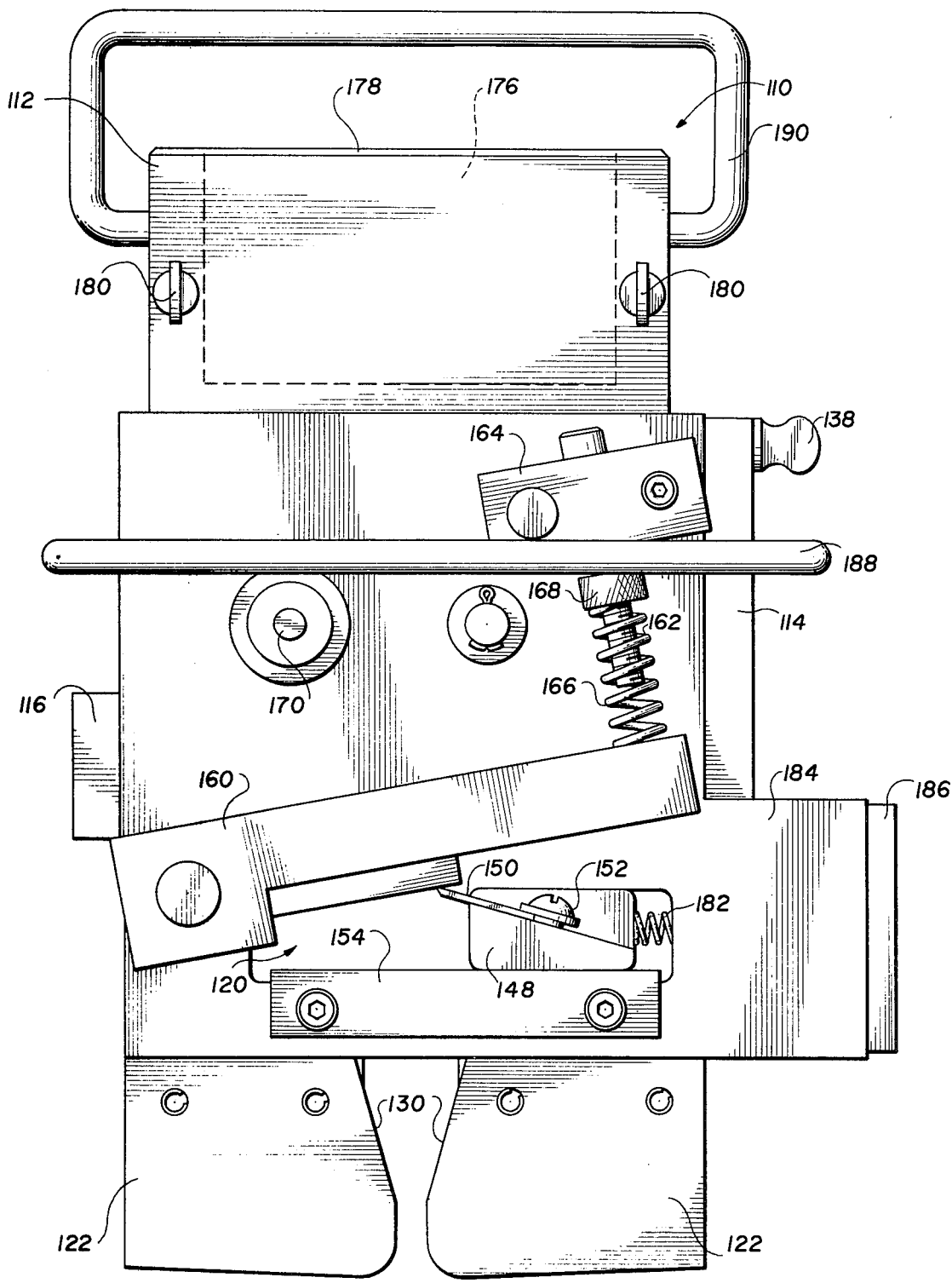
FIG. 4 is a right-side elevational view of the tape applicator head according to another preferred form of the invention.

According to another preferred embodiment, the tape applicator head 10 is constructed to be hand held. In this regard, attention is directed to FIG. 4. The reference numerals for identical parts are retained, increased however by a factor of 100. In this hand held version of the tape applicator head 110, the tape spool and backing strip take-up spool are again not shown. However, they are preferably mounted in the region 176 of the housing 112. For this purpose, the housing is provided with a removable plate 178 which is retained to the housing 112 by thumb screws 180.

Typically, with the hand held version of the tape applicator head, the lay-up desired is not dimensionally extensive, requiring less total tape and therefore a smaller tape spool and backing strip take-up spool. The spools can therefore be dimensioned to fit within the space provided within the housing 112. For example, in the fabrication of helicopter rotor blades filler lay-ups are utilized which are quite small in comparison to a rotor blade spar lay-up.

The hand held tape applicator head 110 may, if desired, include a tape advance structure including a cam roller. It preferably does have idler rollers for handling the backing strip S. Also, the hand held tape applicator head 110 may, if desired, include a tape severing mechanism 120. With this embodiment, however, the actuator 56 would be replaced by manual actuation. For example, each block 148 can be actuated through a spring 182 which moves the block against the lever 160 and is compressed in the process. Each spring 182 (one for each block) extends into a cylinder 184. Each cylinder 184 is connected by a plate 186 which is engaged by the operator's hand.

The tape applicator head 110 is also provided with handles 188 and 190. The handle 188 must be made detachable when a guide block 114 is utilized. The handle 190 need not be detachable. The handles 188 and 190 are engaged by a respective one of the operator's hands for dispensing and compacting the tape.

Method

The method aspect of the invention can be understood by reference to a tape laying sequence utilizing the embodiment of FIGS. 1–3.

To begin a tape laying sequence, the tape T is manually drawn from a tape spool (not shown) and inserted into the tape passage 26. The guide block 14 is then removed and the cam roller 18 is rotated by a hand crank (not shown), which is inserted into the socket 70 (FIG. 1), causing the tape T to be advanced past the idler roller 32. The clearance between the surfaces 36 and 42 is such that the tape T is compressed slightly, but sufficiently to produce movement thereof. When the tape passes the idler roller 32, the operator stops rotating the cam roller 18, reaches into passage 28 and initiates stripping of the backing strip S from the tape T. Then, while again rotating the cam roller 18, the operator redirects the backing strip S onto the surface 42, and continues to rotate the cam roller 18 through one revolution. At the completion of one revolution of the cam roller 18, the tape T has reached the inside edge of the surface portion 30b, and a sufficient length of backing strip S has accumulated in the passage 26, upstream of the idler roller 32 to be connected to a backing strip take-up spool (not shown). The operator then replaces the guide block 14 and secures it to the housing 12 by the thumb screws 38. The operator next reaches into the passage 26 from the top of the housing 12, withdraws the accumulated backing strip S and attaches the free end thereof to the take-up spool. Next, the operator manually withdraws the tape T from the tape dispensing outlet and forms an extended portion sufficient to extend around the curved portion 30c to the portion 30b. In the process, the take-up spool is rotated to take-up the additional backing strip produced while forming the extended portion of the tape. The tape laying operation is now ready to begin.

The operator lowers the tape applicator head 10 toward the working surface 24 (which could be the surface of a working table, or the surface of a mandrel) until the clearance c is attained, with the extended portion of the tape positioned between the surface 30 and the working surface 24. From this point on the operation can continue automatically. A drive (not shown) reciprocates the head 10 in the x—x direction while indexing the head in the vertical direction by an amount sufficient to maintain the clearance c between the tape already dispensed and the tape being dispensed. During the movement of the head in the x—x direction, the tape T alternately engages the surfaces 30 of the two blocks 22. This engagement, in conjunction with the movement imparted by the tape applicator head drive and clearance c, imparts a drive tension to the tape T which draws the tape from its supply spool through the passage 26 without the need for drive rollers. In addition, this arrangement produces compacting of the tape T on the working surface 24. Also, the alternate engagement with the compaction produces a fold in the tape at each terminal end of the tape laying pass, i.e., the compaction produces a pivot point P (FIG. 1) about which the tape is folded by the alternate block.

Once the desired thickness of the lay-up is reached, the tape severing mechanism is actuated. Both actuators 56 are energized causing the mounting blocks 48 to effect an actuating stroke along the guide blocks 54, and severing of the tape by the tape 50, which is secured at each end to the mounting blocks 48. The section of the blade 50 between the mounting blocks 48 engages the tape T and moves the tape into engagement with the edge 72 of the guide block 16, thereby locally increasing the tension in the tape T so that the blade 50 can sever the tape. During severing of the tape T, the portions of the blade 50 which extend from the mounting blocks 48 engage the levers 60 and pivot these levers against the force of the springs 66, increasing the spring force. Upon completion of the severing stroke, the actuators 56 are de-energized and the spring forces return the mounting 48 to their initial positions. The spring forces cause this return by pivoting the levers 60 back to their initial positions.

Preferably, the actuators 46 are pneumatic actuators which impart pressurized air to closed chambers 74 behind the mounting blocks 48. After the tape T is severed, the pressurized air is exhausted from the chambers 74 by exhaust means (not shown).

Unless the supply spool is depleted, the tape laying operation can continue following severing of the tape by simply advancing the tape utilizing the cam roller 18.

If desired, the tape can be layed in parallel rows by indexing the head 10 in the y—y direction.

Due to the two blocks 22, the tape T can be dispensed and compacted without the need to rotate the head 10.

What is claimed is:

1. A tape applicator head for dispensing tape in two opposing directions while maintaining the orientation of the head unchanged, wherein the tape includes a backing strip and the tape applicator head comprises:
    a housing through which a tape passenger is defined terminating in a tape dispensing outlet;
    guide means mounted within the housing adjacent to the tape passage for guiding the backing strip from the tape as the tape passes through the tape passage to the tape dispensing outlet, and
    a pair of dispensing compactor surfaces mounted to the housing adjacent to each other at the dispensing outlet of the tape passage, the dispensing compactor surfaces having spaced, symmetrically oriented surfaces which laterally delimit the tape passage at the dispensing outlet and which alternately engage the tape during movement of the head in the two opposing directions, and impart to the tape a driving tension which draws the tape through the tape passage.

2. The tape applicator head as defined in claim 1, further comprising:
    tape advancing means mounted to the housing for advancing the tape through a predetermined length past the dispensing compactor surfaces; and
    tape severing means mounted to the housing and actuated to sever the tape.

3. The tape applicator head as defined in claim 2, wherein the tape severing means comprises: blade means mounted to the housing for transversely intersecting the tape passage; actuating means mounted to the housing for producing an actuating stroke of the blade means; and return means mounted to the housing for producing a return stroke of the blade means.

4. The tape applicator head as defined in claim 3, wherein the actuating means comprises a pair of hydraulic cylinders, and wherein the return means comprises at least one spring biased lever.

5. The tape applicator head as defined in claim 2, wherein the guide means comprises an idler roller and a surface of the housing which is spaced from and is coextensive with a portion of the outer surface of the idler roller and defines with the outer surface of the idler roller a backing strip passage which intersects the tape passage.

6. The tape applicator head as defined in claim 5, wherein the tape advancing means comprises a cam roller the outer surface of which includes a circular portion the circumference of which equals said predetermined length of the tape, and wherein the predetermined length of tape engages the outer surface of the idler roller and the circular portion of the cam roller for its displacement toward the tape dispensing outlet.

7. The tape applicator head as defined in claim 6, wherein the tape advancing means further comprises a driven crank which engages the cam roller for rotation thereof.

8. The tape applicator head as defined in claim 2, wherein the guide means comprises an idler roller and a guide block, the guide block being removably mounted to the housing and defining a surface which, when the guide block is mounted to the housing, is spaced from and is coextensive with a portion of the outer surface of the idler roller and defines with the outer surface of the idler roller a backing strip passage which intersects the tape passage.

9. The tape applicator head as defined in claim 8, wherein the tape advancing means comprises a cam roller the outer surface of which includes a circular portion the circumference of which equals said predetermined length the tape, and wherein the predetermined length of tape engages the outer surface of the idler roller and the circular portion of the cam roller for its displacement toward the tape dispensing outlet.

10. The tape applicator head as defined in claim 9, wherein the tape advancing means further comprises a driven crank which engages the cam roller for rotation thereof.

11. In combination, a working surface on which a tape is laid, and a tape applicator head for laying the tape by dispensing the tape onto the working surface and compacting the tape on the working surface, wherein the tape includes a backing strip and the tape applicator head comprises:
    a housing through which a tape passage is defined terminating in a tape dispensing outlet;
    guide means mounted within the housing adjacent to the tape passage for guiding the backing strip from the tape as the tape passes through the tape passage to the tape dispensing outlet; and
    compacting means mounted to the housing at the dispensing outlet of the tape passage, said compacting means including at least one continuous, partly curved surface which extends from the tape passage, outwardly therefrom and substantially parallel to the working surface, with the minimum clearance between the working surface and the continuous surface being less than the thickness of the tape, so that the tape is compacted as it is dispensed onto the working surface.

12. The tape applicator head as defined in claim 11, further comprising:
    tape advancing means mounted to the housing for advancing the tape through a predetermined length past the dispensing outlet; and
    tape severing means mounted to the housing and actuated to sever the tape.

13. The tape applicator head as defined in claim 12, wherein the tape severing means comprises: blade means mounted to the housing for transversely intersecting the tape passage; actuating means mounted to the housing for producing an actuating stroke of the blade means; and return means mounted to the housing for producing a return stroke of the blade means.

14. The tape applicator head as defined in claim 13, wherein the actuating means comprises a pair of hydraulic cylinders, and wherein the return means comprises at least one spring biased lever.

15. The tape applicator head as defined in claim 12, wherein the guide means comprises an idler roller and a surface of the housing which is spaced from and is coextensive with a portion of the outer surface of the idler roller and defines with the outer surface of the idler roller a backing strip passage which intersects the tape passage.

16. The tape applicator head as defined in claim 15, wherein the tape advancing means comprises a cam roller the outer surface of which includes a circular portion the circumference of which equals said predetermined length of the tape, and wherein the predetermined length of tape engages the outer surface of the idler roller and the circular portion of the cam roller for its displacement toward the tape dispensing outlet.

17. The tape applicator head as defined in claim 16, wherein the tape advancing means further comprises a manually operated crank which engages the cam roller for rotation thereof.

18. The tape applicator head as defined in claim 12, wherein the guide means comprises an idler roller and a guide block, the guide block being removably mounted to the housing and defining a surface which, when the guide block is mounted to the housing, is spaced from and is coextensive with a portion of the outer surface of the idler roller and defines with the outer surface of the idler roller a backing strip passage which intersects the tape passage.

19. The tape applicator head as defined in claim 18, wherein the tape advancing means comprises a cam roller the outer surface of which includes a circular portion the circumference of which equals said predetermined length of the tape, and wherein the predetermined length of tape engages the outer surface of the idler roller and the circular portion of the cam roller for its displacement toward the tape dispensing outlet.

20. The tape applicator head as defined in claim 19, wherein the tape advancing means further comprises a manually operated crank which engages the cam roller for rotation thereof.

21. In combination, a working surface on which a tape is laid, and a tape applicator head for laying the tape by dispensing the tape onto the working surface in two opposing directions while maintaining the orientation of the head unchanged and compacting the tape on the working surface, wherein the tape includes a backing strip and the tape applicator head comprises:

a housing through which a tape passage is defined terminating in a tape dispensing outlet;

guide means mounted within the housing adjacent to the tape passage for guiding the backing strip from the tape as the tape passes through the tape passage to the tape dispensing outlet; and dispensing and compacting means mounted to the housing at the dispensing outlet of the tape passage, the dispensing and compacting means having spaced, symmetrically oriented, partly curved surfaces which laterally delimit the tape passage at the dispensing outlet and extend outwardly therefrom and substantially parallel to the working surface, with the minimum clearance between the working surface and the outwardly extending curved surfaces being less than the thickness of the tape, said partly curved surfaces alternately engage the tape to impart to the tape a driving tension which draws the tape through the tape passage and to compact the tape as it is dispensed onto the working surface, during movement of the head in the two opposing directions.

22. The tape applicator head as defined in claim 21, further comprising:

tape advancing means mounted to the housing for advancing the tape through a predetermined length past the dispensing outlet; and tape severing means mounted to the housing and actuated to sever the tape.

23. The tape applicator head as defined in claim 22, wherein the tape severing means comprises: blade means mounted to the housing for transversely intersecting the tape passage; actuating means mounted to the housing for producing an actuating stroke of the blade means; and return means mounted to the housing for producing a return stroke of the blade means.

24. The tape applicator head as defined in claim 23, wherein the actuating means comprises a pair of hydraulic cylinders, and wherein the return means comprises at least one spring biased lever.

25. The tape applicator head as defined in claim 22, wherein the guide means comprises an idler roller and a surface of the housing which is spaced from and is coextensive with a portion of the outer surface of the idler roller and defines with the outer surface of the idler roller a backing strip passage which intersects the tape passage.

26. The tape applicator head as defined in claim 25, wherein the tape advancing means comprises a cam roller the outer surface of which includes a circular portion the circumference of which equals said predetermined length of the tape, and wherein the predetermined length of tape engages the outer surface of the idler roller and the circular portion of the cam roller for its displacement toward the tape dispensing outlet.

27. The tape applicator head as defined in claim 26, wherein the tape advancing means further comprises a manually operated crank which engages the cam roller for rotation thereof.

28. The tape applicator head as defined in claim 22, wherein the guide means comprises an idler roller and a guide block, the guide block being removably mounted to the housing and defining a surface which, when the guide block is mounted to the housing, is spaced from and is coextensive with a portion of the outer surface of the idler roller and defines with the outer surface of the idler roller a backing strip passage which intersects the tape passage.

29. The tape applicator head as defined in claim 28, wherein the tape advancing means comprises a cam roller the outer surface of which includes a circular portion the circumference of which equals said predetermined length of the tape, and wherein the predetermined length of tape engages the outer surface of the idler roller and the circular portion of the cam roller for its displacement toward the tape dispensing outlet.

30. The tape applicator head as defined in claim 29, wherein the tape advancing means further comprises a manually operated crank which engages the cam roller for rotation thereof.

* * * * *